US012223874B2

(12) United States Patent
Kim et al.

(10) Patent No.: US 12,223,874 B2
(45) Date of Patent: Feb. 11, 2025

(54) METHOD AND APPARATUS FOR ADJUSTING BRIGHTNESS OF DISPLAY

(71) Applicants: Huizhou China Star Optoelectronics Display Co., Ltd., Huizhou (CN); TCL China Star Optoelectronics Technology Co., Ltd., Shenzhen (CN)

(72) Inventors: Yoongu Kim, Huizhou (CN); Yizhuo Zhao, Huizhou (CN); Yuhua Chang, Huizhou (CN)

(73) Assignees: Huizhou China Star Optoelectronics Display Co., Ltd., Huizhou (CN); TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/618,554

(22) PCT Filed: Nov. 23, 2021

(86) PCT No.: PCT/CN2021/132397
§ 371 (c)(1),
(2) Date: Dec. 13, 2021

(87) PCT Pub. No.: WO2023/077567
PCT Pub. Date: May 11, 2023

(65) Prior Publication Data

US 2024/0296772 A1 Sep. 5, 2024

(30) Foreign Application Priority Data

Nov. 5, 2021 (CN) ......................... 202111303326.8

(51) Int. Cl.
*G09G 3/20* (2006.01)

(52) U.S. Cl.
CPC ... *G09G 3/2007* (2013.01); *G09G 2320/0247* (2013.01); *G09G 2320/0271* (2013.01);
(Continued)

(58) Field of Classification Search
CPC ......... G09G 3/2007; G09G 2320/0247; G09G 2320/0271; G09G 2320/0626; G09G 2320/0693
See application file for complete search history.

(56) References Cited

U.S. PATENT DOCUMENTS

2010/0053137 A1 3/2010 Park et al.
2015/0206276 A1 7/2015 Jung et al.

FOREIGN PATENT DOCUMENTS

CN 105074807 A 11/2015
CN 105632443 A 6/2016
(Continued)

OTHER PUBLICATIONS

English Translation of CN 113380170 (Year: 2021).*
(Continued)

*Primary Examiner* — Patrick N Edouard
*Assistant Examiner* — Eboni N Giles
(74) *Attorney, Agent, or Firm* — Nathan & Associates; Menachem Nathan

(57) ABSTRACT

A method and an apparatus for adjusting a brightness of a display are provided. The method includes: acquiring a gray scale number and a working frequency; determining a first gray scale compensation value of a preset calibration area using a preset gray scale compensation mapping table; determining a second gray scale compensation value of a non-preset calibration area according to the first gray scale compensation value; controlling, according to the first gray scale compensation value, the preset calibration area for displaying; and controlling, according to the second gray scale compensation value, the non-preset calibration area for displaying.

20 Claims, 3 Drawing Sheets

(52) U.S. Cl.
CPC ............... *G09G 2320/0626* (2013.01); *G09G 2320/0693* (2013.01)

(56) References Cited

FOREIGN PATENT DOCUMENTS

| | | | |
|---|---|---|---|
| CN | 106057159 | A | 10/2016 |
| CN | 106910483 | A | 6/2017 |
| CN | 108538264 | A | 9/2018 |
| CN | 108735178 | A | 11/2018 |
| CN | 110189721 | A | 8/2019 |
| CN | 111292701 | A | 6/2020 |
| CN | 111540331 | A | 8/2020 |
| CN | 111883038 | A | 11/2020 |
| CN | 112116894 | A | 12/2020 |
| CN | 112419976 | A | 2/2021 |
| CN | 112767867 | A | 5/2021 |
| CN | 113380170 | A | 9/2021 |
| TW | I724842 | B | 4/2021 |

OTHER PUBLICATIONS

English Translation of CN 105632443 (Year: 2016).*
English Translation of CN 106057159 (Year: 2016).*
English Translation of TW 1715178 (Year: 2021).*

* cited by examiner

METHOD AND APPARATUS FOR ADJUSTING BRIGHTNESS OF DISPLAY

FIELD OF INVENTION

The present disclosure relates to the field of display technologies, and in particular, to a method and an apparatus for adjusting a brightness of a display.

BACKGROUND OF INVENTION

A display usually works at a fixed frequency, for example, a most common frequency of 120 Hz. In some particular situations, such as a game mode, the display is usually required to display at a variable refresh rate (VRR). For a display having a VRR technology, a highest frame and a lowest frame have a same charging time but different blanking times. Since a frame at a low frame rate has a longer duration, a blanking time thereof is longer than that at a high frame rate. An excessively long blanking time aggravates the impact of panel leakage, resulting in reduction of the overall brightness of the panel. If the display is switched between different frequencies within a short time, a difference between brightnesses at different frequencies causes serious panel flicker.

An excessively long blanking time aggravates the impact of panel leakage, resulting in reduction of the overall brightness of the panel. If the display is switched between different frequencies within a short time, a difference between brightnesses at different frequencies causes serious panel flicker.

SUMMARY OF INVENTION

Technical Solution

Embodiments of the present disclosure provide a method and apparatus for adjusting a brightness of a display, to resolve the problem that the brightness of a picture on a display varies at different frequencies, so as to alleviate picture flicker on the display during variation of the working frequency, thereby enhancing the quality of the display.

According to a first aspect, an embodiment of the present disclosure provides a method for adjusting a brightness of a display. The method includes:

dividing pixel points of a display screen into a preset calibration area and a non-preset calibration area, wherein the non-preset calibration area includes a first type of non-preset calibration area and a second type of non-preset calibration area, the first type of non-preset calibration area is located between two preset calibration areas, and end points of the second type of non-preset calibration area are end points of different preset calibration areas respectively;

acquiring a gray scale number for displaying and a working frequency for displaying of a display screen;

determining a first gray scale compensation value of the preset calibration area of the display screen according to the gray scale number for displaying and the working frequency using a preset gray scale compensation mapping table, wherein gray scale numbers and gray scale compensation values of the preset calibration area at working frequency nodes in the preset gray scale compensation mapping table are in a one-to-one correspondence;

determining a second gray scale compensation value of the non-preset calibration area of the display screen according to the first gray scale compensation value;

controlling, according to the first gray scale compensation value, the preset calibration area to reach a preset brightness for displaying; and controlling, according to the second gray scale compensation value, the non-preset calibration area to reach the preset brightness for displaying.

In some embodiments, the determining a first gray scale compensation value of the preset calibration area of the display screen according to the gray scale number for displaying and the working frequency using a preset gray scale compensation mapping table includes:

if the working frequency is one of the working frequency nodes in the gray scale compensation mapping table, determining the first gray scale compensation value of the preset calibration area of the display screen according to the gray scale number for displaying, the working frequency, and the gray scale compensation mapping table.

In some embodiments, the determining a first gray scale compensation value of the preset calibration area of the display screen according to the gray scale number for displaying and the working frequency using a preset gray scale compensation mapping table includes:

if the working frequency is not one of the working frequency nodes in the gray scale compensation mapping table, determining a first working frequency node and a second working frequency node in the gray scale compensation mapping table adjacent to the working frequency;

acquiring a third gray scale compensation value of the preset calibration area according to the first working frequency node;

acquiring a fourth gray scale compensation value of the preset calibration area of the display screen according to the second working frequency node; and determining the first gray scale compensation value of the preset calibration area according to the third gray scale compensation value and the fourth gray scale compensation value.

In some embodiments, the determining a second gray scale compensation value of the non-preset calibration area of the display screen according to the first gray scale compensation value includes:

determining a second gray scale compensation value of each pixel point in the first type of non-preset calibration area according to first gray scale compensation values of the two preset calibration areas adjacent to the first type of non-preset calibration area.

In some embodiments, the determining a second gray scale compensation value of the non-preset calibration area of the display screen according to the first gray scale compensation value includes:

determining a second gray scale compensation value of each pixel point in the second type of non-preset calibration area according to first gray scale compensation values of a plurality of preset calibration areas sharing end points with the second type of non-preset calibration area.

According to a second aspect, an embodiment of the present disclosure provides a method for adjusting a brightness of a display. The method includes:

acquiring a gray scale number for displaying and a working frequency for displaying of a display screen;

determining a first gray scale compensation value of a preset calibration area of the display screen according to the gray scale number for displaying and the working frequency using a preset gray scale compensation mapping table, wherein gray scale numbers and gray scale compensation values of the preset calibration area at working frequency nodes in the preset gray scale compensation mapping table are in a one-to-one correspondence;

determining a second gray scale compensation value of a non-preset calibration area of the display screen according to the first gray scale compensation value; and controlling, according to the first gray scale compensation value, the preset calibration area to reach a preset brightness for displaying; and controlling, according to the second gray scale compensation value, the non-preset calibration area to reach the preset brightness for displaying.

In some embodiments, the determining a first gray scale compensation value of a preset calibration area of the display screen according to the gray scale number for displaying and the working frequency using a preset gray scale compensation mapping table includes:

if the working frequency is one of the working frequency nodes in the gray scale compensation mapping table, determining the first gray scale compensation value of the preset calibration area of the display screen according to the gray scale number for displaying, the working frequency, and the gray scale compensation mapping table.

In some embodiments, the working frequency nodes are uniformly spaced apart from each other.

In some embodiments, the working frequency nodes are randomly spaced apart from each other.

In some embodiments, the determining a first gray scale compensation value of a preset calibration area of the display screen according to the gray scale number for displaying and the working frequency using a preset gray scale compensation mapping table includes:

if the working frequency is not one of the working frequency nodes in the gray scale compensation mapping table, determining a first working frequency node and a second working frequency node in the gray scale compensation mapping table adjacent to the working frequency;

acquiring a third gray scale compensation value of the preset calibration area according to the first working frequency node;

acquiring a fourth gray scale compensation value of the preset calibration area of the display screen according to the second working frequency node; and determining the first gray scale compensation value of the preset calibration area according to the third gray scale compensation value and the fourth gray scale compensation value.

In some embodiments, before the acquiring a gray scale number for displaying and a working frequency for displaying of a display screen, the method includes:

dividing pixel points of the display screen into the preset calibration area and the non-preset calibration area, wherein the non-preset calibration area includes a first type of non-preset calibration area and a second type of non-preset calibration area, the first type of non-preset calibration area is located between two preset calibration areas, and end points of the second type of non-preset calibration area are end points of different preset calibration areas respectively.

In some embodiments, the preset calibration area is set as one pixel unit, and pixel points in one preset calibration area correspond to one first gray scale compensation value.

In some embodiments, the determining a second gray scale compensation value of a non-preset calibration area of the display screen according to the first gray scale compensation value includes:

determining a second gray scale compensation value of each pixel point in the first type of non-preset calibration area according to first gray scale compensation values of the two preset calibration areas adjacent to the first type of non-preset calibration area.

In some embodiments, the determining a second gray scale compensation value of a non-preset calibration area of the display screen according to the first gray scale compensation value includes:

determining a second gray scale compensation value of each pixel point in the second type of non-preset calibration area according to first gray scale compensation values of a plurality of preset calibration areas sharing end points with the second type of non-preset calibration area.

In some embodiments, the first gray scale compensation value includes a first positive polarity compensation value and a first negative polarity compensation value, the second gray scale compensation value includes a second positive polarity compensation value and a second negative polarity compensation value, and the determining a second gray scale compensation value of a non-preset calibration area of the display screen according to the first gray scale compensation value includes:

determining the second positive polarity compensation value of the non-preset calibration area of the display screen according to the first positive polarity compensation value; and determining the second negative polarity compensation value of the non-preset calibration area of the display screen according to the first negative polarity compensation value.

In some embodiments, the determining the second positive polarity compensation value of the non-preset calibration area of the display screen according to the first positive polarity compensation value includes:

determining a second positive polarity compensation value of each pixel point in the first type of non-preset calibration area according to first positive polarity compensation values of the two preset calibration areas adjacent to the first type of non-preset calibration area.

In some embodiments, the determining the second negative polarity compensation value of the non-preset calibration area of the display screen according to the first negative polarity compensation value includes:

determining a second negative polarity compensation value of each pixel point in the second type of non-preset calibration area according to first negative polarity compensation values of a plurality of preset calibration areas sharing end points with the second type of non-preset calibration area.

In some embodiments, before the acquiring a gray scale number for displaying and a working frequency for displaying of a display screen, the method includes:

adjusting a brightness of the preset calibration area of the display to the preset brightness with a target gray scale number at a target frequency, to determine a gray scale compensation value in the gray scale compensation mapping table corresponding to the target frequency and the target gray scale number.

In some embodiments, the preset brightness is a brightness corresponding to gray scale numbers at a highest working frequency of the display screen.

According to a third aspect, the present disclosure provides an apparatus for adjusting a brightness of a display. The apparatus includes:

- an information acquisition module configured to acquire a gray scale number for displaying and a working frequency for displaying of a display screen;
- a compensation value analysis module communicatively connected to the information acquisition module and configured to determine a first gray scale compensation value of a preset calibration area of the display screen according to the gray scale number for displaying and the working frequency using a preset gray scale compensation mapping table, wherein gray scale numbers and gray scale compensation values of the preset calibration area at working frequency nodes in the preset gray scale compensation mapping table are in a one-to-one correspondence, and determine a second gray scale compensation value of a non-preset calibration area of the display screen according to the first gray scale compensation value; and
- a pixel display module communicatively connected to the compensation value analysis module and configured to control, according to the first gray scale compensation value, the preset calibration area to display, and control, according to the second gray scale compensation value, the non-preset calibration area to display.

In some embodiments, the compensation value analysis module is further configured to: if the working frequency is one of the working frequency nodes in the gray scale compensation mapping table, determine the first gray scale compensation value of the preset calibration area of the display screen according to the gray scale number for displaying, the working frequency, and the gray scale compensation mapping table.

In some embodiments, the working frequency nodes are uniformly spaced apart from each other.

In some embodiments, the working frequency nodes are randomly spaced apart from each other.

In some embodiments, the compensation value analysis module is further configured to: if the working frequency is not one of the working frequency nodes in the gray scale compensation mapping table, determine a first working frequency node and a second working frequency node in the gray scale compensation mapping table adjacent to the working frequency; acquire a third gray scale compensation value of the preset calibration area according to the first working frequency node; acquire a fourth gray scale compensation value of the preset calibration area of the display screen according to the second working frequency node; and determine the first gray scale compensation value of the preset calibration area according to the third gray scale compensation value and the fourth gray scale compensation value.

In some embodiments, the compensation value analysis module is further configured to divide pixel points of the display screen into the preset calibration area and the non-preset calibration area, wherein the non-preset calibration area includes a first type of non-preset calibration area and a second type of non-preset calibration area, the first type of non-preset calibration area is located between two preset calibration areas, and end points of the second type of non-preset calibration area are end points of different preset calibration areas respectively.

In some embodiments, the preset calibration area is set as one pixel unit, and pixel points in one preset calibration area correspond to one first gray scale compensation value.

In some embodiments, the compensation value analysis module is further configured to determine a second gray scale compensation value of each pixel point in the first type of non-preset calibration area according to first gray scale compensation values of the two preset calibration areas adjacent to the first type of non-preset calibration area.

In some embodiments, the compensation value analysis module is further configured to determine a second gray scale compensation value of each pixel point in the second type of non-preset calibration area according to first gray scale compensation values of a plurality of preset calibration areas sharing end points with the second type of non-preset calibration area.

In some embodiments, the compensation value analysis module is further configured to: determine a second positive polarity compensation value of the non-preset calibration area of the display screen according to a first positive polarity compensation value, wherein the first gray scale compensation value includes the first positive polarity compensation value and a first negative polarity compensation value, and the second gray scale compensation value includes the second positive polarity compensation value and a second negative polarity compensation value; and determine the second negative polarity compensation value of the non-preset calibration area of the display screen according to the first negative polarity compensation value.

In some embodiments, the compensation value analysis module is further configured to determine a second positive polarity compensation value of each pixel point in the first type of non-preset calibration area according to first positive polarity compensation values of the two preset calibration areas adjacent to the first type of non-preset calibration area.

In some embodiments, the compensation value analysis module is further configured to determine a second negative polarity compensation value of each pixel point in the second type of non-preset calibration area according to first negative polarity compensation values of a plurality of preset calibration areas sharing end points with the second type of non-preset calibration area.

In some embodiments, the information acquisition module is further configured to adjust a brightness of the preset calibration area of the display to the preset brightness with a target gray scale number at a target frequency, to determine a gray scale compensation value corresponding to the target frequency and the target gray scale number in the gray scale compensation mapping table.

In some embodiments, the preset brightness is a brightness corresponding to gray scale numbers at a highest working frequency of the display screen.

Beneficial Effects

According to the method and apparatus for adjusting a brightness of a display provided in the embodiments of the present disclosure, the first gray scale compensation value of the gray scale number for displaying of the preset calibration area at the working frequency is determined using the preset gray scale compensation mapping table, then the second gray scale compensation value of the non-preset calibration area is determined according to the first gray scale compensation value of the preset calibration area, and the areas of the display screen are controlled to reach the preset brightness using the first gray scale compensation value and the second gray scale compensation value. The embodiments of the present disclosure are intended to resolve the problems that the brightness of a picture on the display varies at different frequencies and the compensation values of the areas of the display also vary, so as to alleviate the picture flicker on the display during variation of the working frequency, thereby enhancing the quality of the display.

BRIEF DESCRIPTION OF DRAWINGS

The following describes specific implementations of the present disclosure in detail with reference to the accompanying drawings, to make the technical solutions and other beneficial effects of the present disclosure obvious.

DETAILED DESCRIPTION OF PREFERRED EMBODIMENTS

Figure 1:
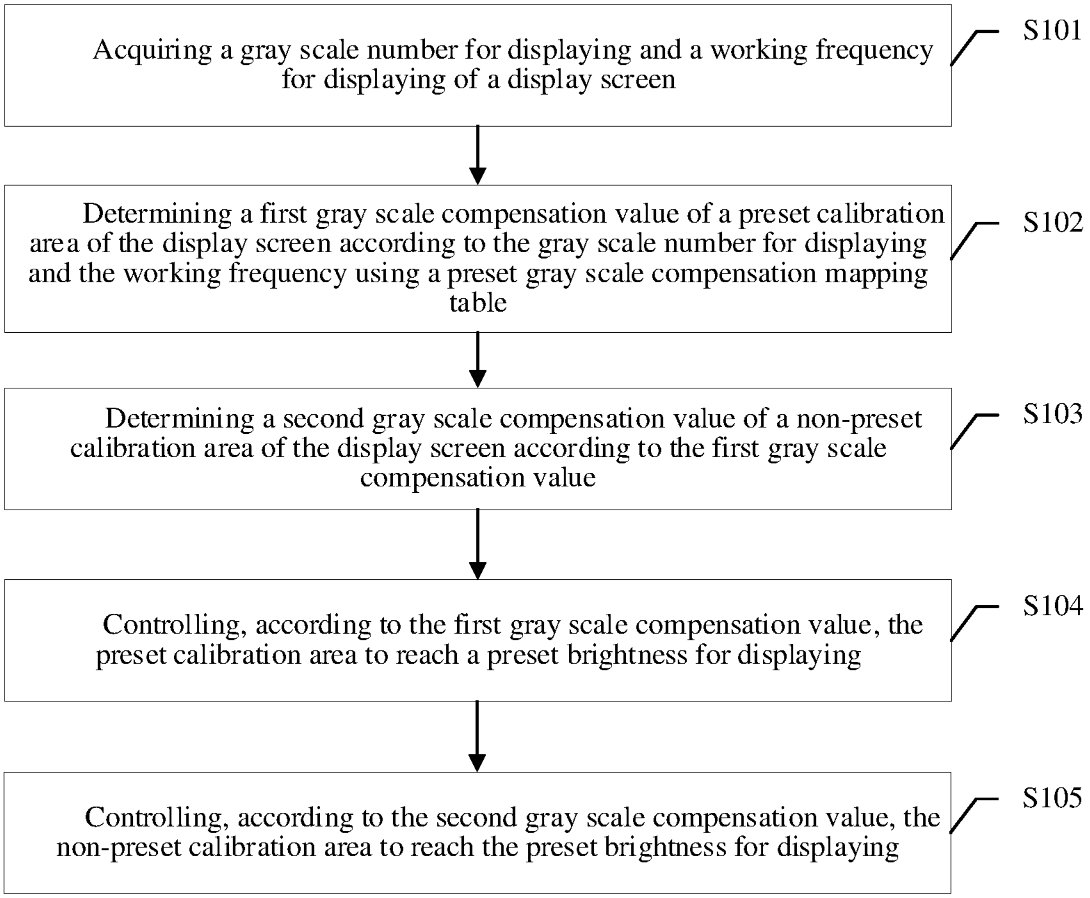
FIG. 1 is a schematic flowchart of a method for adjusting a brightness of a display according to an embodiment of the present disclosure.

The following clearly and completely describes technical solutions in the embodiments of the present disclosure with reference to the accompanying drawings in the embodiments of the present disclosure. Apparently, the described embodiments are only some embodiments rather than all the embodiments of the present disclosure. All other embodiments obtained by a person skilled in the art based on the embodiments of the present disclosure without creative efforts shall fall within the protection scope of the present disclosure.

In the description of the present disclosure, it should be understood that orientation or position relationships indicated by the terms such as "center", "longitudinal", "transverse", "length", "width", "thickness", "above", "below", "front", "rear", "left", "right", "vertical", "horizontal", "top", "bottom", "inside", "outside", "clockwise", and "anticlockwise" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of the present disclosure. In addition, terms "first" and "second" are used merely for the purpose of description, and shall not be construed as indicating or implying relative importance or implying a quantity of indicated technical features. Thus, features defined by "first" and "second" may explicitly or implicitly include one or more of the features. In the descriptions of the present disclosure, "a plurality of" means two or more, unless otherwise definitely and specifically limited.

In the description of the present disclosure, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection or may communicate with each other; or the connection may be a direct connection, an indirect connection through an intermediate medium, internal communication between two components, or an interaction relationship between two components. A person of ordinary skill in the art may understand the specific meanings of the foregoing terms in the present disclosure according to specific situations.

In the present disclosure, unless otherwise explicitly stipulated and restricted, that a first feature is "on" or "under" a second feature may include that the first and second features are in direct contact, or may include that the first and second features are not in direct contact but in contact by using other features therebetween. In addition, that the first feature is "on", "above", or "over" the second feature includes that the first feature is right above and on the inclined top of the second feature or merely indicates that a level of the first feature is higher than that of the second feature. That the first feature is "below", "under", or "beneath" the second feature includes that the first feature is right below and at the inclined bottom of the second feature or merely indicates that a level of the first feature is lower than that of the second feature.

Many different implementations or examples are provided in the following disclosure to implement different structures of the present disclosure. Certainly, they are merely examples and are not intended to limit the present disclosure. In addition, in the present disclosure, reference numerals and/or reference letters may be repeated in different examples. The repetition is for the purposes of simplification and clarity, but does not indicate a relationship between various embodiments and/or settings that are discussed. Moreover, the present disclosure provides examples of various particular processes and materials, but a person of ordinary skill in the art may be aware of application of other processes and/or use of other materials.

Referring to FIG. 1, an embodiment of the present disclosure provides a method for adjusting a brightness of a display. The method includes steps S101 to S105. Details are as follows.

S101: Acquiring a gray scale number for displaying and a working frequency for displaying of a display screen.

The gray scale number for displaying is a gray scale number required for displaying a picture on the display screen, and the working frequency is a refresh rate required by the display screen for displaying, such as 60 Hz. That is to say, the display screen is required to be controlled to display the gray scale number for displaying at the working frequency.

It is to be noted that, the display screen may currently display no pictures. In this case, the display screen is directly adjusted to display the gray scale number for displaying at the working frequency. The display screen may also currently be displaying pictures at a certain frequency. The certain frequency may be same or different from the working frequency. If the certain frequency is different from the working frequency, the display is required to be switched to a different frequency.

S102: Determining a first gray scale compensation value of a preset calibration area of the display screen according to the gray scale number for displaying and the working frequency using a preset gray scale compensation mapping table, wherein gray scale numbers and gray scale compensation values of the preset calibration area at working frequency nodes in the preset gray scale compensation mapping table are in a one-to-one correspondence.

Gray scale numbers in the gray scale compensation mapping table at different working frequencies have respective gray scale compensation values. By virtue of the gray scale numbers and the gray scale compensation values at the different working frequencies, the brightness of the display can reach a preset brightness at all of the frequencies. Therefore, the brightness does not change when the display is switched between different working frequencies. In this way, no flicker occurs on a panel. It is to be noted that, the preset brightness may be set according to using habits of a user, which is not limited in detail in the present embodiment. However, the display has a highest brightness when working at a maximum allowed frequency. In order to facilitate gray scale compensation and stability of the brightness of the display screen, the preset brightness may be set as a brightness corresponding to the gray scale numbers at the highest working frequency of the display screen. That is to say, the gray scale numbers are not required to be compensated when the display screen is at the highest working frequency.

A setting range of the working frequency in the gray scale compensation mapping table is from a lowest frequency to a highest frequency supported by the display, for example, from 60 Hz to 120 Hz. The gray scale numbers are gray scale numbers supported by the display, for example, ranging from 0 gray scales to 255 gray scales. In the gray scale compensation mapping table, gray scale numbers corresponding to each working frequency correspond to a group of gray scale compensation values at the working frequency. However, when the range from the lowest frequency to the highest frequency supported by the display is relatively large, in order to reduce early calibration, the gray scale compensation mapping table provides the gray scale compensation values of the gray scale numbers at only some of the working frequencies, that is to say, only some of the working frequency nodes are selectively calibrated. The gray scale compensation values of the gray scale numbers at the working frequencies of remaining non-working frequency nodes may be obtained by means of interpolation. For example, gray scale compensation values of gray scale numbers at working frequency nodes of 60 Hz, 80 Hz, 100 Hz, and 120 Hz are configured in the gray scale compensation mapping table. More working frequency nodes bring finer compensation.

As the working frequency decrease, a corresponding gray scale is required to be increased to maintain the brightness of the display. For example, a brightness corresponding to a gray scale L127 at 120 Hz is 70 nits. In order to maintain 70 nits at 48 Hz, an output gray scale is required to be compensated to L133, that is, compensated by 5 gray scales. In other words, the gray scale compensation value corresponding to the gray scale L127 at the working frequency node of 48 Hz is 5.

The gray scale compensation values are determined in the following manner. A target gray scale number is outputted at a selected target frequency. The target frequency is any frequency within the range from the lowest frequency to the highest frequency supported by the display. For example, if the range from the lowest frequency to the highest frequency supported by the display is 60 Hz to 120 Hz, the target frequency may be any frequency from 60 Hz to 120 Hz. The target gray scale number is any of the gray scale numbers supported by the display. For example, if the gray scale numbers supported by the display range from 0 gray scales to 255 gray scales, the target gray scale number may be any gray scale number from 0 to 255 gray scales. It is to be noted that, although any target frequency and any target gray scale number are selected to describe a process of acquiring a corresponding gray scale compensation value, gray scale compensation values of all target frequencies and target gray scale numbers are acquired in a same manner as follows.

If a brightness during display of the target gray scale number is same as the preset brightness or a difference between the brightness during display of the target gray scale number and the preset brightness is within a preset error range, gray scale compensation is not required for the target gray scale number at the selected target frequency. That is to say, the gray scale compensation value is 0. The target gray scale number is directly outputted at the target frequency. Otherwise, gray scale compensation is required. The brightness of the display is adjusted to the preset brightness, and a required gray scale number is used as the gray scale compensation value corresponding to the target gray scale number.

The manner of determining the gray scale compensation values is described using an example that the preset brightness is the brightness corresponding to the gray scale numbers at the highest working frequency of the display screen. If the target frequency is the highest working frequency of the display screen, the gray scale compensation value of the target gray scale number is 0. For example, a highest refresh rate supported by the display is 120 Hz. When the selected target frequency is 120 Hz and the target gray scale number is L127, the gray scale compensation value in the gray scale compensation mapping table corresponding to the target gray scale number L127 is 0. That is to say, when L127 is required to be displayed at 120 Hz, L127 may be directly outputted without compensation on the basis of L127. If the target frequency is not the highest working frequency of the display screen, the brightness of the display is adjusted to the brightness corresponding to the target gray scale number at the highest working frequency. For example, the highest refresh rate supported by the display is 120 Hz. When the selected target frequency is 48 Hz and the target gray scale number is L127, the brightness of L127 at 48 Hz is lower than that of L127 at 120 Hz. Therefore, L127 cannot be directly outputted at 48 Hz. Instead, gray scale compensation is required to be performed. When the brightness of the display is adjusted to be same as that of L127 at 120 Hz, the gray scale number is L132, the target frequency is 48 Hz, and the gray scale compensation value corresponding to the target gray scale number of L127 is 5. That is to say, when L127 is required to be displayed at 48 Hz, L132 is actually outputted, and 5 gray scales are required to be compensated on the basis of L127. In order to avoid a change of the brightness during frequency switching when the display screen displays any gray scale number for displaying at any working frequency, the target gray scale numbers at all of the target frequencies are adjusted to a same preset brightness during display.

It is to be noted that, due to a process difference, the gray scale compensation values at different in-plane positions of the display vary. Therefore, compensation for sub-areas is required. The display screen is divided into the preset calibration area and a non-preset calibration area. Similarly, in order to reduce the early calibration, only the gray scale compensation values of pixel points in the preset calibration area are calibrated. The gray scale compensation values of pixel points in the non-preset calibration area may be acquired according to the gray scale compensation values of the pixel points in the preset calibration area. Therefore, determining the gray scale compensation values of the gray scale numbers for displaying at the working frequencies according to the preset gray scale compensation mapping table actually means determining the gray scale compensation values corresponding to the gray scale numbers for displaying of the preset calibration area at the working frequencies.

In the present embodiment, the preset brightness is set as the brightness corresponding to the gray scale numbers at the highest working frequency of the display screen. That is to say, the brightness at the highest working frequency is used as a reference. When the display is working at a low frequency, a picture brightness is compensated, so that the display maintains a same brightness regardless of the working frequency. Therefore, changes in the brightness during the frequency switching are avoided.

In an embodiment, this step includes steps as follows: S201: If the working frequency is one of the working frequency nodes in the gray scale compensation mapping table, determining the first gray scale compensation value of the preset calibration area of the display screen according to the gray scale number for displaying, the working frequency, and the gray scale compensation mapping table.

In detail, when the range from the lowest frequency to the highest frequency supported by the display is relatively large, in order to reduce early calibration and reduce required storage resources, the gray scale compensation mapping table provides the gray scale compensation values of the gray scale numbers at only some of the working frequencies, that is to say, only some of the working frequency nodes are selectively calibrated. For example, the gray scale compensation values of the gray scale numbers at the working frequency nodes of 60 Hz, 80 Hz, 100 Hz, and 120 Hz are configured in the gray scale compensation mapping table. If the working frequency is one of the working frequency nodes in the gray scale compensation mapping table, for example, the working frequency is 60 Hz, the first gray scale compensation value of the preset calibration area may be directly queries from the gray scale compensation mapping table.

In an embodiment, this step includes steps as follows: S301: If the working frequency is not one of the working frequency nodes in the gray scale compensation mapping table, determining a first working frequency node and a second working frequency node in the gray scale compensation mapping table adjacent to the working frequency. S302: Acquiring a third gray scale compensation value of the preset calibration area according to the first working frequency node. S303: Acquiring a fourth gray scale compensation value of the preset calibration area of the display screen according to the second working frequency node. S304: Determining the first gray scale compensation value according to the third gray scale compensation value and the fourth gray scale compensation value.

The working frequency nodes may be freely set, as long as it is ensured that the gray scale compensation values of the gray scale numbers at the working frequencies not included in the gray scale compensation mapping table can be obtained by analyzing the gray scale compensation values of other gray scale numbers. Therefore, the gray scale compensation values of the gray scale numbers at all of the working frequencies can be acquired. According to an analyzed law of the gray scale compensation values, the gray scale compensation values of the gray scale numbers at the working frequencies conforming to an interpolation law are omitted in the gray scale compensation mapping table. Therefore, the working frequency nodes are set at intervals. A value of each interval may be fixed. For example, the working frequency nodes in the gray scale compensation mapping table may be successively 48 Hz, 54 Hz, 60 Hz, and so on. Alternatively, the value of the each interval may be random. For example, the working frequency nodes in the gray scale compensation mapping table are successively 48 Hz, 50 Hz, 60 Hz, and so on. In addition, similar to the working frequency nodes set at intervals, the gray scale numbers at each working frequency node may also be set at intervals. The gray scale numbers that are not calibrated are also interpolated according to the gray scale compensation values corresponding to the adjacent gray scale numbers.

If the working frequency is not one of the working frequency nodes in the gray scale compensation mapping table, the first gray scale compensation value may be determined according to the gray scale compensation values of the gray scale numbers at the adjacent working frequency nodes in the gray scale compensation mapping table. The first working frequency node and the second working frequency node in the gray scale compensation mapping table adjacent to the working frequency are first determined. For example, if the working frequency is 70 Hz, it may be determined from the above gray scale compensation mapping table that the first working frequency node is 60 Hz and the second working frequency node is 80 Hz. Then, the third gray scale compensation value and the fourth gray scale compensation value of the gray scale number for displaying of the preset calibration area at the first working frequency node and the second working frequency node are respectively acquired according to the gray scale compensation mapping table. Finally, the first gray scale compensation value is determined according to the third gray scale compensation value and the fourth gray scale compensation value, for example, using a bilinear interpolation, which is not limited in detail in the present embodiment.

In an embodiment, before step S101 of acquiring the gray scale number for displaying and the working frequency for displaying of the display screen, the method includes the following steps. S401: Dividing pixel points of the display screen into the preset calibration area and the non-preset calibration area, wherein the non-preset calibration area includes a first type of non-preset calibration area and a second type of non-preset calibration area, the first type of non-preset calibration area is located between two preset calibration areas, and end points of the second type of non-preset calibration area are end points of different preset calibration areas respectively.

In detail, due to a process difference, the gray scale compensation values at different in-plane positions in a surface of the display also vary. Therefore, compensation for sub-areas is required. In order to reduce the early calibration, only the gray scale compensation values of the pixel points of partial areas in the display are calibrated. An area in which the gray scale compensation values are calibrated is defined as the preset calibration area. Therefore, the display screen is divided into the preset calibration area and the non-preset calibration area. The gray scale compensation values of the pixel points in the non-preset calibration area are obtained by interpolating the gray scale compensation values of the pixel points in the preset calibration area. Shapes of the preset calibration area and the non-preset calibration area may be triangles, rectangles, polygons, or the like, which are not limited in detail in the present embodiment.

Figure 2:
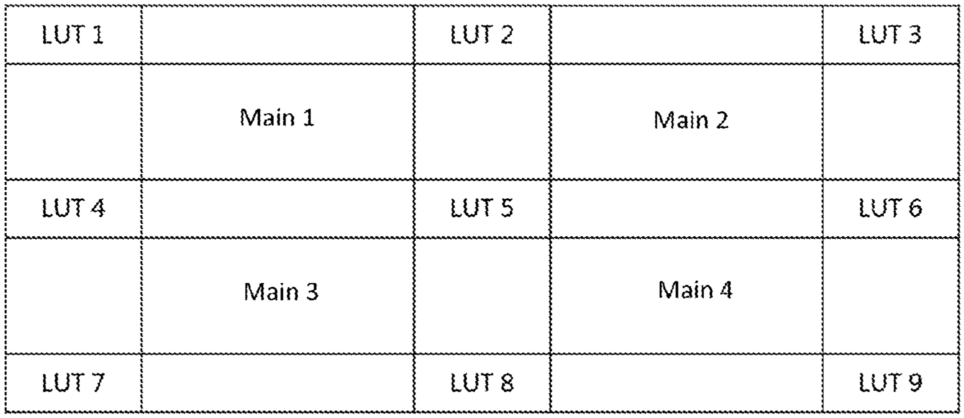
FIG. 2 is a schematic diagram of a preset calibration area and a non-preset calibration area divided in a display according to an embodiment of the present disclosure.

In order to ensure that the gray scale compensation values of the non-preset calibration area can be obtained by interpolating the gray scale compensation values of the preset calibration area, each boundary of the non-preset calibration area is located between at most two preset calibration areas. The non-preset calibration area includes the first type of non-preset calibration area and the second type of non-preset calibration area. The first type of non-preset calibration area is located between the two preset calibration areas. The end points of the second type of non-preset calibration area are the end points of the different preset calibration areas respectively. The gray scale compensation values of the pixel points in the first type of non-preset calibration area and the second type of non-preset calibration area can be uniquely determined using the gray scale compensation values of the pixel points of the preset calibration area. As shown in FIG. 2, the preset calibration area, the first type of non-preset calibration area, and the second type of non-preset calibration area are all configured as rectangles. 9 areas identified as LUT1 to LUT9 are the preset calibration areas. 4 areas identified as Main1 to Main4 are the second type of non-preset calibration areas. The remaining areas having no identifications are the first type of non-preset calibration areas. The second type of non-preset calibration area Main1 is used as an example. An upper boundary of Main1 is located between the preset calibration areas LUT1 and LUT2. A lower boundary is located between the preset calibration areas LUT4 and LUT5. A left boundary is located between the preset calibration areas LUT1 and LUT4. A right boundary is located between the preset calibration areas LUT2 and LUT5.

Further, each of the preset calibration areas includes a plurality of pixel points. The first gray scale compensation values corresponding to the plurality of pixel points in one preset calibration area have a little difference within a preset range. Therefore, the preset calibration area is set as one pixel unit. The pixel points in one preset calibration area correspond to one first gray scale compensation value. Correspondingly, the pixel points in the first type of non-preset calibration area located between the two preset calibration areas are in a long line shape. Only one pixel unit is present in a corresponding vertical direction. As shown in FIG. 2, the 9 areas identified as LUT1 to LUT9 are the preset calibration areas, and each are one pixel unit. The pixel points in the first type of non-preset calibration area located between the preset calibration areas LUT1 and LUT4 extend only in a longitudinal direction (that is, a direction of a line connecting the preset calibration areas LUT1 and LUT4).

S103: Determining a second gray scale compensation value of the non-preset calibration area of the display screen according to the first gray scale compensation value.

In detail, the gray scale compensation values of the pixel points in the non-preset calibration area are obtained by interpolating the gray scale compensation values of the pixel points in the preset calibration area. Therefore, the second gray scale compensation value of the non-preset calibration area of the display screen is determined according to the first gray scale compensation value.

In an embodiment, this step includes steps as follows: S501: Determining a second gray scale compensation value of each pixel point in the first type of non-preset calibration area according to the first gray scale compensation values of the two preset calibration areas adjacent to the first type of non-preset calibration area.

In detail, when the non-preset calibration area is the first type of non-preset calibration area, since the pixel points in the first type of non-preset calibration area extend only between the two adjacent preset calibration areas, the second gray scale compensation value of the each pixel point in the first type of non-preset calibration area is determined according to the first gray scale compensation values of the two preset calibration areas adjacent to the first type of non-preset calibration area.

As shown in FIG. 2, the pixel points in the first type of non-preset calibration area located between the preset calibration areas LUT1 and LUT4 is used as an example. The pixel points in the area extend only in the longitudinal direction (that is, the direction of the line connecting the preset calibration areas LUT1 and LUT4), the area is considered as one pixel unit in a transverse direction, and the plurality of pixel points in one pixel unit corresponding to one gray scale compensation value. Therefore, the corresponding second gray scale compensation value may be obtained merely by means of interpolation according to the first gray scale compensation value of LUT1 and LUT4 and longitudinal coordinates of the pixel points in the area, without a need of considering horizontal coordinates of the positions of the pixel points in the area.

In an embodiment, this step includes steps as follows: S601: Determining a second gray scale compensation value of each pixel point in the second type of non-preset calibration area according to first gray scale compensation values of four preset calibration areas sharing end points with the second type of non-preset calibration area.

In detail, when the non-preset calibration area is the second type of non-preset calibration area, since the end points of the second type of non-preset calibration area respectively belong to different preset calibration areas, the second gray scale compensation value of the each pixel point in the second type of non-preset calibration area is determined according to the first gray scale compensation values of the plurality of preset calibration areas sharing the end points with the second type of non-preset calibration area.

As shown in FIG. 2, the pixel points in the second type of non-preset calibration area Main1 connected to the preset calibration areas LUT1 to LUT4 are used as an example. The corresponding second gray scale compensation value may be obtained merely by means of interpolation according to the first gray scale compensation values of the preset calibration areas LUT1 to LUT4 and longitudinal coordinates and transverse coordinates of the pixel points in the area Main1.

Figure 3:
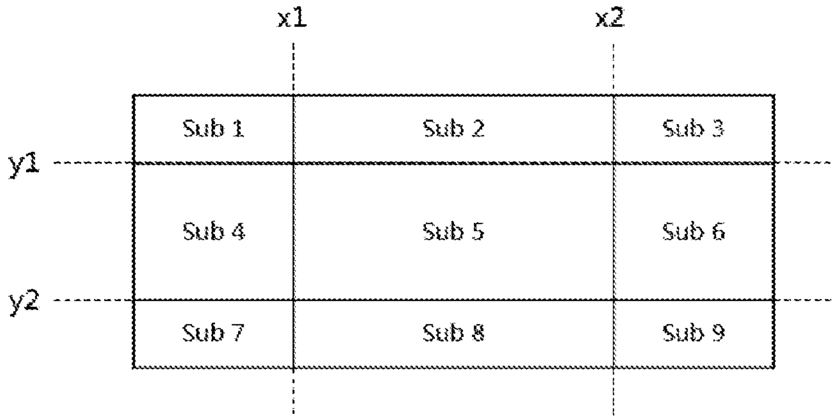
FIG. 3 is a schematic diagram of a sub area of the display according to an embodiment of the present disclosure.

For ease of understanding, examples are provided below, which should not be construed as a limitation to the present embodiment. As shown in FIG. 2, the display is divided into 25 in-plane areas numbered as 1 to 25. The $1^{st}$ area, the $3^{rd}$ area, the $5^{th}$ area, the $11^{th}$ area, the $13^{th}$ area, the $15^{th}$ area, the $21^{st}$ area, the $23^{rd}$ area, and the $25^{th}$ area identified as LUT1 to LUT9 are the preset calibration areas. The gray scale compensation values used in the 9 areas are the first gray scale compensation values. The 4 areas identified as Main1 to Main4 are the second type of non-preset calibration areas. The remaining areas having no identifications are the first type of non-preset calibration areas. The preset calibration area, the first type of non-preset calibration area, and the second type of non-preset calibration area are all configured as rectangles. The gray scale compensation values of the remaining 16 non-preset calibration areas are obtained by interpolating the gray scale compensation values of the adjacent preset calibration areas. A detailed method is as follows. The 25 areas are divided into 4 sub-areas. An area 7 (Main1) and surrounding 8 areas are recorded as a first sub-area. An area 9 (Main2) and surrounding 8 areas are recorded as a second sub-area. An area 17 (Main3) and surrounding 8 areas are recorded as a third sub-area. An area 19 (Main4) and surrounding 8 areas are recorded as a fourth sub-area. As shown in FIG. 3, in each sub-area, the 9 areas from left to right and top to bottom are successively recorded as sub1 to sub9. The overlapping first type of non-preset calibration areas in the sub-areas may be assigned to a large sub-area or a small sub-area. This does not affect a final interpolation result. Boundaries of each sub-area are recorded as x1, x2, y1, and y2. Each sub-area includes 4 preset calibration areas. For each preset calibration area, one gray scale compensation value may be obtained by directly querying the table (when the working frequency is one of the working frequency nodes in the gray scale compensation mapping table) or by interpolation according to frequency (when the working frequency is not one of the working frequency nodes in the gray scale compensation mapping table), which are recorded as $f(Q_{11})$, $f(Q_{21})$, $f(Q_{12})$, and $f(Q_{22})$. A calculated pixel coordinate is recorded as (x, y). When x is less than x1, let x=x1, and x1 is substituted into a formula. When x is greater than x2, let x=x2, and x2 is substituted into the formula. When y is less than y1, let y=y1, and y1 is substituted into the formula. When y is greater than y2, let y=y2, and y2 is substituted into the formula. By means of calculation, the gray scale compensation values of the pixels are obtained. A calculation method is:

$$f(x,y)=\frac{f(Q_{11})}{(x2-x1)(y2-y1)}(x2-x)(y2-y)+\frac{f(Q_{21})}{(x2-x1)(y2-y1)}(x-x1)(y2-y)+\frac{f(Q_{12})}{(x2-x1)(y2-y1)}(x2-x)(y-y1)+\frac{f(Q_{22})}{(x2-x1)(y2-y1)}(x-x1)(y-y1).$$

In an embodiment, this step includes steps as follows: S701: Determining a second positive polarity compensation value of the non-preset calibration area of the display screen according to a first positive polarity compensation value, wherein the first gray scale compensation value includes the first positive polarity compensation value and a first negative polarity compensation value, and the second gray scale compensation value includes the second positive polarity compensation value and a second negative polarity compensation value. S702: Determining the second negative polarity compensation value of the non-preset calibration area of the display screen according to the first negative polarity compensation value.

During actual panel designing, Vcom voltages at different positions deviate. A position closer to an edge position brings a larger deviation. In this case, a positive polarity brightness and a negative polarity brightness corresponding to one gray scale may be different. For example, at a position having a deviated Vcom voltage, the positive polarity brightness of L126 is same as the negative polarity brightness of L128, aggravating the flicker during the frequency switching. Therefore, compensation is required to be performed on the display for the positive polarity brightness and the negative polarity brightness by using a group of gray scale compensation values separately.

In detail, the gray scale compensation mapping table includes a positive polarity compensation value and a negative polarity compensation value. Determining the first gray scale compensation value of the preset calibration area of the display screen according to the gray scale number for displaying, the working frequency, and the gray scale compensation mapping table means determining the first positive polarity compensation value and the first negative polarity compensation value of the preset calibration area respectively. Then, the second positive polarity compensation value of the non-preset calibration area of the display screen is determined according to the first positive polarity compensation value of the preset calibration area, and the second negative polarity compensation value of the non-preset calibration area of the display screen is determined according to the first negative polarity compensation value of the preset calibration area. Processes of determining the second positive polarity compensation value and the second negative polarity compensation value are same as the process of determining the second gray scale compensation value in the above embodiments.

S104: Controlling, according to the first gray scale compensation value, the preset calibration area to reach a preset brightness for displaying.

S105: Controlling, according to the second gray scale compensation value, the non-preset calibration area to reach the preset brightness for displaying.

In detail, on the basis of the gray scale number for displaying at the working frequency, the brightness of the preset calibration area is compensated to the preset brightness using the first gray scale compensation value, and the brightness of the non-preset calibration area is compensated to the preset brightness using the second gray scale compensation value.

In the present embodiment, in order to resolve the serious flicker during repeated switching of the display between different frequencies, actually outputted gray scale values at different working frequencies are adjusted to compensate for the decreased display brightness caused by leakage, so as to alleviate the brightness reduction of the display during a low frequency period, thereby enhancing the quality of the display.

Figure 4:
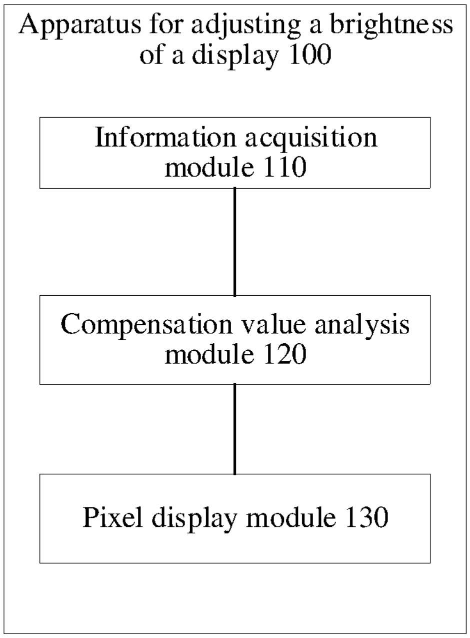
FIG. 4 is a schematic diagram of a structure of an apparatus for adjusting a brightness of a display according to an embodiment of the present disclosure.

In order to perform the method for adjusting a brightness of a display in the embodiments of the present disclosure more effectively, the embodiments of the present disclosure further provide an apparatus for adjusting a brightness of a display on the basis of the method for adjusting a brightness of a display. As shown in FIG. 4, the apparatus 100 for adjusting a brightness of a display includes:

an information acquisition module 110 configured to acquire a gray scale number for displaying and a working frequency for displaying of a display screen;

a compensation value analysis module 120 communicatively connected to the information acquisition module 110 and configured to determine a first gray scale compensation value of a preset calibration area of the display screen according to the gray scale number for displaying and the working frequency using a preset gray scale compensation mapping table, wherein gray scale numbers and gray scale compensation values of the preset calibration area at working frequency nodes in the preset gray scale compensation mapping table are in a one-to-one correspondence, and determine a second gray scale compensation value of a non-preset calibration area of the display screen according to the first gray scale compensation value; and a pixel display module 130 communicatively connected to the compensation value analysis module 120 and configured to control, according to the first gray scale compensation value, the preset calibration area to display, and control, according to the second gray scale compensation value, the non-preset calibration area to display.

In some embodiments of the present disclosure, the compensation value analysis module 120 is further configured to: if the working frequency is one of the working frequency nodes in the gray scale compensation mapping table, determine the first gray scale compensation value of the preset calibration area of the display screen according to the gray scale number for displaying, the working frequency, and the gray scale compensation mapping table.

In some embodiments, the working frequency nodes are uniformly spaced apart from each other.

In some embodiments, the working frequency nodes are randomly spaced apart from each other.

In some embodiments of the present disclosure, the compensation value analysis module 120 is further configured to: if the working frequency is not one of the working frequency nodes in the gray scale compensation mapping table, determine a first working frequency node and a second working frequency node in the gray scale compensation mapping table adjacent to the working frequency; acquire a third gray scale compensation value of the preset calibration area according to the first working frequency node; acquire a fourth gray scale compensation value of the preset calibration area of the display screen according to the second working frequency node; and determine the first gray scale compensation value of the preset calibration area according to the third gray scale compensation value and the fourth gray scale compensation value.

In some embodiments of the present disclosure, the compensation value analysis module 120 is further configured to divide pixel points of the display screen into the preset calibration area and the non-preset calibration area, wherein the non-preset calibration area includes a first type of non-preset calibration area and a second type of non-preset calibration area, the first type of non-preset calibration area is located between two preset calibration areas, and end points of the second type of non-preset calibration area are end points of different preset calibration areas respectively.

In some embodiments of the present disclosure, the preset calibration area is set as one pixel unit, and pixel points in one preset calibration area correspond to one first gray scale compensation value.

In some embodiments of the present disclosure, the compensation value analysis module 120 is further configured to determine a second gray scale compensation value of each pixel point in the first type of non-preset calibration area according to first gray scale compensation values of the two preset calibration areas adjacent to the first type of non-preset calibration area.

In some embodiments of the present disclosure, the compensation value analysis module 120 is further configured to determine a second gray scale compensation value of each pixel point in the second type of non-preset calibration area according to first gray scale compensation values of a plurality of preset calibration areas sharing end points with the second type of non-preset calibration area.

In some embodiments of the present disclosure, the compensation value analysis module 120 is further configured to: determine a second positive polarity compensation value of the non-preset calibration area of the display screen according to a first positive polarity compensation value, wherein the first gray scale compensation value includes the first positive polarity compensation value and a first negative polarity compensation value, and the second gray scale compensation value includes the second positive polarity compensation value and a second negative polarity compensation value; and determine the second negative polarity compensation value of the non-preset calibration area of the display screen according to the first negative polarity compensation value.

In some embodiments, the compensation value analysis module 120 is further configured to determine a second positive polarity compensation value of each pixel point in the first type of non-preset calibration area according to first positive polarity compensation values of the two preset calibration areas adjacent to the first type of non-preset calibration area.

In some embodiments, the compensation value analysis module 120 is further configured to determine a second negative polarity compensation value of each pixel point in the second type of non-preset calibration area according to first negative polarity compensation values of a plurality of preset calibration areas sharing end points with the second type of non-preset calibration area.

In some embodiments, the information acquisition module 110 is further configured to adjust a brightness of the preset calibration area of the display to the preset brightness with a target gray scale number at a target frequency, to determine a gray scale compensation value corresponding to the target frequency and the target gray scale number in the gray scale compensation mapping table.

In some embodiments, the preset brightness is a brightness corresponding to gray scale numbers at a highest working frequency of the display screen.

The descriptions of the above embodiments have respective emphasis. For parts not described in detail in a certain embodiment, reference may be made to related descriptions of other embodiments.

An embodiment of the present disclosure provides an electronic device. The electronic device includes one or more processors, a memory, and one or more applications. The one or more applications are stored in the memory and configured to be executed by the processors to perform the steps of the above method for adjusting a brightness of a display. The steps of the above method for adjusting a brightness of a display herein may be the steps of the methods for adjusting brightness of a display in the above embodiments.

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

A method and apparatus for adjusting a brightness of a display, an electronic device, and a computer-readable storage medium provided in the embodiments of the present disclosure are described in detail above. The principle and implementations of the present disclosure are described herein through specific examples. The description about the embodiments of the present disclosure is merely provided to help understand the technical solutions and core ideas of the present disclosure. Meanwhile, a person of ordinary skill in the art may make modifications to the specific implementations and application range according to the idea of the present disclosure. In conclusion, the content of this specification is not construed as a limitation to the present disclosure.

What is claimed is:

1. A method for adjusting a brightness of a display, comprising:

dividing pixel points of a display screen into a preset calibration area and a non-preset calibration area, wherein the non-preset calibration area comprises a first type of non-preset calibration area and a second type of non-preset calibration area, the first type of non-preset calibration area is located between two preset calibration areas, and end points of the second type of non-preset calibration area are end points of four different preset calibration areas respectively;

acquiring a gray scale number for displaying and a working frequency for displaying of a display screen;

determining a first gray scale compensation value of the preset calibration area of the display screen according to the gray scale number for displaying and the working frequency using a preset gray scale compensation mapping table, wherein gray scale numbers and gray scale compensation values of the preset calibration area at working frequency nodes in the preset gray scale compensation mapping table are in a one-to-one correspondence;

determining a second gray scale compensation value of the first type of non-preset calibration area of the display screen according to first gray scale compensation values of the two preset calibration areas adjacent to the first type of non-preset calibration area;

determining a second gray scale compensation value of the second type of non-preset calibration area of the display screen according to first gray scale compensation values of the four different preset calibration areas sharing end points with the second type of non-preset calibration area;

controlling, according to the first gray scale compensation value of the preset calibration area, the preset calibration area to reach a preset brightness for displaying;

controlling, according to the second gray scale compensation value of the first type of non-preset calibration area, the first type of non-preset calibration area to reach the preset brightness for displaying; and controlling, according to the second gray scale compensation value of the second type of non-preset calibration area, the second type of non-preset calibration area to reach the preset brightness for displaying;

wherein each preset calibration area is set as one pixel unit, and pixel points in one preset calibration area correspond to one first gray scale compensation value.

2. The method for adjusting a brightness of a display as claimed in claim 1, wherein the determining a first gray scale compensation value of the preset calibration area of the display screen according to the gray scale number for displaying and the working frequency using a preset gray scale compensation mapping table comprises:

if the working frequency is one of the working frequency nodes in the gray scale compensation mapping table, determining the first gray scale compensation value of the preset calibration area of the display screen according to the gray scale number for displaying, the working frequency, and the gray scale compensation mapping table.

3. The method for adjusting a brightness of a display as claimed in claim 1, wherein the determining a first gray scale compensation value of the preset calibration area of the display screen according to the gray scale number for displaying and the working frequency using a preset gray scale compensation mapping table comprises:

if the working frequency is not one of the working frequency nodes in the gray scale compensation mapping table, determining a first working frequency node and a second working frequency node in the gray scale compensation mapping table adjacent to the working frequency;

acquiring a third gray scale compensation value of the preset calibration area according to the first working frequency node;

acquiring a fourth gray scale compensation value of the preset calibration area of the display screen according to the second working frequency node; and determining the first gray scale compensation value of the preset calibration area according to the third gray scale compensation value and the fourth gray scale compensation value.

4. The method for adjusting a brightness of a display as claimed in claim 1, wherein the determining a second gray scale compensation value of the first type of non-preset calibration area of the display screen according to first gray scale compensation values of the two preset calibration areas adjacent to the first type of non-preset calibration area comprises:

determining a second gray scale compensation value of each pixel point in the first type of non-preset calibration area by interpolating according to the first gray scale compensation values of the two preset calibration areas adjacent to the first type of non-preset calibration area and longitudinal coordinates of the pixel points in the first type of non-preset calibration area.

5. The method for adjusting a brightness of a display as claimed in claim 1, wherein the determining a second gray scale compensation value of the second type of non-preset calibration area of the display screen according to first gray scale compensation values of the four different preset calibration areas sharing end points with the second type of non-preset calibration area comprises:

determining a second gray scale compensation value of each pixel point in the second type of non-preset calibration area by interpolating according to the first gray scale compensation values of the four different preset calibration areas sharing end points with the second type of non-preset calibration area and both longitudinal coordinates and transverse coordinates of the pixel points in the second type of non-preset calibration area respectively.

6. A method for adjusting a brightness of a display, comprising:

acquiring a gray scale number for displaying and a working frequency for displaying of a display screen;

determining a first gray scale compensation value of a preset calibration area of the display screen using a preset gray scale compensation mapping table according to the to-be-displayed gray scale number and the working frequency, wherein gray scale numbers and gray scale compensation values of the preset calibration area at working frequency nodes in the preset gray scale compensation mapping table are in a one-to-one correspondence;

determining a second gray scale compensation value of a first type of non-preset calibration area located between two preset calibration areas of the display screen according to first gray scale compensation values of the two preset calibration areas adjacent to the first type of non-preset calibration area;

determining a second gray scale compensation value of a second type of non-preset calibration area sharing end points with four different preset calibration areas of the display screen according to first gray scale compensation values of the four different preset calibration areas respectively;

controlling, according to the first gray scale compensation value of the preset calibration area, the preset calibration area to reach a preset brightness for displaying;

controlling, according to the second gray scale compensation value of the first type of non-preset calibration area, the first type of non-preset calibration area to reach the preset brightness for displaying; and controlling, according to the second gray scale compensation value of the second type of non-preset calibration area, the second type of non-preset calibration area to reach the preset brightness for displaying;

wherein each preset calibration area is set as one pixel unit, and pixel points in one preset calibration area correspond to one first gray scale compensation value.

7. The method for adjusting a brightness of a display as claimed in claim 6, wherein the determining a first gray scale compensation value of a preset calibration area of the display screen according to the gray scale number for displaying and the working frequency using a preset gray scale compensation mapping table comprises:

if the working frequency is one of the working frequency nodes in the gray scale compensation mapping table, determining the first gray scale compensation value of the preset calibration area of the display screen according to the gray scale number for displaying, the working frequency, and the gray scale compensation mapping table.

8. The method for adjusting a brightness of a display as claimed in claim 6, wherein the working frequency nodes are uniformly spaced apart from each other.

9. The method for adjusting a brightness of a display as claimed in claim 6, wherein the working frequency nodes are randomly spaced apart from each other.

10. The method for adjusting a brightness of a display as claimed in claim 6, wherein the determining a first gray scale compensation value of a preset calibration area of the display screen according to the gray scale number for displaying and the working frequency using a preset gray scale compensation mapping table comprises:

if the working frequency is not one of the working frequency nodes in the gray scale compensation mapping table, determining a first working frequency node and a second working frequency node in the gray scale compensation mapping table adjacent to the working frequency;

acquiring a third gray scale compensation value of the preset calibration area according to the first working frequency node;

acquiring a fourth gray scale compensation value of the preset calibration area of the display screen according to the second working frequency node; and determining the first gray scale compensation value of the preset calibration area according to the third gray scale compensation value and the fourth gray scale compensation value.

11. The method for adjusting a brightness of a display as claimed in claim 6, wherein before the acquiring a gray scale number for displaying and a working frequency for displaying of a display screen, the method comprises:

dividing pixel points of the display screen into the preset calibration area and the non-preset calibration area comprising the first type of non-preset calibration area and the second type of non-preset calibration area.

12. The method for adjusting a brightness of a display as claimed in claim 11, wherein the determining a second gray scale compensation value of the first type of non-preset calibration area of the display screen according to first gray scale compensation values of the two preset calibration areas adjacent to the first type of non-preset calibration area comprises:

determining a second gray scale compensation value of each pixel point in the first type of non-preset calibration area by interpolating according to the first gray scale compensation values of the two preset calibration areas adjacent to the first type of non-preset calibration area and longitudinal coordinates of the pixel points in the first type of non-preset calibration area.

13. The method for adjusting a brightness of a display as claimed in claim 11, wherein the determining a second gray scale compensation value of the second type of non-preset calibration area of the display screen according to first gray scale compensation values of the four different preset calibration areas adjacent to the first type of non-preset calibration area comprises:

determining a second gray scale compensation value of each pixel point in the second type of non-preset calibration area by interpolating according to the first gray scale compensation values of the four different preset calibration areas sharing end points with the second type of non-preset calibration area and both longitudinal coordinates and transverse coordinates of the pixel points in the second type of non-preset calibration area respectively.

14. The method for adjusting a brightness of a display as claimed in claim 11, wherein the first gray scale compensation value comprises a first positive polarity compensation value and a first negative polarity compensation value, the second gray scale compensation value comprises a second positive polarity compensation value and a second negative polarity compensation value, and the determining a second gray scale compensation value of a non-preset calibration area of the display screen according to the first gray scale compensation value comprises:

determining the second positive polarity compensation value of the non-preset calibration area of the display screen according to the first positive polarity compensation value; and determining the second negative polarity compensation value of the non-preset calibration area of the display screen according to the first negative polarity compensation value.

15. The method for adjusting a brightness of a display as claimed in claim 14, wherein the determining the second positive polarity compensation value of the non-preset calibration area of the display screen according to the first positive polarity compensation value comprises:

determining a second positive polarity compensation value of each pixel point in the first type of non-preset calibration area according to first positive polarity compensation values of the two preset calibration areas adjacent to the first type of non-preset calibration area.

16. The method for adjusting a brightness of a display as claimed in claim 14, wherein the determining the second negative polarity compensation value of the non-preset calibration area of the display screen according to the first negative polarity compensation value comprises:

determining a second negative polarity compensation value of each pixel point in the second type of non-preset calibration area according to first negative polarity compensation values of a plurality of preset calibration areas sharing end points with the second type of non-preset calibration area.

17. The method for adjusting a brightness of a display as claimed in claim 6, wherein before the acquiring a gray scale number for displaying and a working frequency for displaying of a display screen, the method comprises:

adjusting a brightness of the preset calibration area of the display to the preset brightness with a target gray scale number at a target frequency, to determine a gray scale compensation value in the gray scale compensation mapping table corresponding to the target frequency and the target gray scale number.

18. The method for adjusting a brightness of a display as claimed in claim 6, wherein the preset brightness is a brightness corresponding to gray scale numbers at a highest working frequency of the display screen.

19. An apparatus for adjusting a brightness of a display, comprising:

an information acquisition module configured to acquire a gray scale number for displaying and a working frequency for displaying of a display screen;

a compensation value analysis module communicatively connected to the information acquisition module and configured to:

determine a first gray scale compensation value of a preset calibration area of the display screen according to the gray scale number for displaying and the working frequency using a preset gray scale compensation mapping table, wherein gray scale numbers and gray scale compensation values of the preset calibration area at working frequency nodes in the preset gray scale compensation mapping table are in a one-to-one correspondence, determine a second gray scale compensation value of a first type of non-preset calibration area located between two preset calibration areas of the display screen according to first gray scale compensation values of the two preset calibration areas adjacent to the first type of non-preset calibration area, and determine a second gray scale compensation value of a second type of non-preset calibration area sharing end points with four different preset calibration areas of the display screen according to first gray scale compensation values of the four different preset calibration areas respectively; and a pixel display module communicatively connected to the compensation value analysis module and configured to:

control, according to the first gray scale compensation value of the preset calibration area, the preset calibration area to display, control, according to the second gray scale compensation value of the first type of non-preset calibration area, the first type of non-preset calibration area to display, and control, according to the second gray scale compensation value of the second type of non-preset calibration area, the second type of non-preset calibration area to display;

wherein each preset calibration area is set as one pixel unit, and pixel points in one preset calibration area correspond to one first gray scale compensation value.

20. The apparatus as claimed in claim 19, wherein the compensation value analysis module is further configured to:

divide pixel points of the display screen into the preset calibration area and the non-preset calibration area comprising the first type of non-preset calibration area and the second type of non-preset calibration area; and determine a second gray scale compensation value of each pixel point in the first type of non-preset calibration area by interpolating according to the first gray scale compensation values of the two preset calibration areas adjacent to the first type of non-preset calibration area and longitudinal coordinates of the pixel points in the first type of non-preset calibration area; and determine a second gray scale compensation value of each pixel point in the second type of non-preset calibration area by interpolating according to the first gray scale compensation values of the four different preset calibration areas sharing end points with the second type of non-preset calibration area and both longitudinal coordinates and transverse coordinates of the pixel points in the second type of non-preset calibration area respectively.

* * * * *